United States Patent Office 3,087,928
Patented Apr. 30, 1963

3,087,928
METHOD FOR PREPARING N-ALKYL-MORPHOLINES
Norman B. Godfrey, Austin, Tex., assignor to Jefferson Chemical Company, Inc., Houston, Tex., a corporation of Delaware
No Drawing. Filed Nov. 15, 1961, Ser. No. 152,651
10 Claims. (Cl. 260—247)

This invention relates to a method for the preparation of N-alkylmorpholines. More particularly, this invention relates to an improved method for the production of N-alkylmorpholines.

N-alkylmorpholines, which may be used, for example, as catalysts in the production of polyurethane foams, are normally prepared in pure form only with difficulty because of the problems that are normally encountered in attempting to alkylate morpholine on the "N" position or in attempting a synthesis from other classes of raw materials such as bis(chloralkyl) ethers and alkylamines.

It has now been surprisingly discovered, however, that N-alkylmorpholine can be prepared with good yield by the direct alkylation of a morpholine with a non-tertiary alkanol in the presence of hydrogen and a catalyst when the reaction is conducted in the presence of a catalyst composed of about 50 to 90 wt. percent of nickel or cobalt or a mixture thereof, from about 10 to 50 wt. percent of copper and about 0.5 to 5 wt. percent of metal oxide selected from a class consisting of chromium oxide, titanium oxide, thorium oxide, magnesium oxide, zinc oxide, manganese oxide and rare earth oxides.

The starting materials for the present invention include hydrogen, morpholine or a C-alkylmorpholine (i.e., a morpholine substituted on 1 to 4 of the ring carbon atoms with an alkyl group containing 1 to 4 carbon atoms and a non-tertiary alkanol such as methanol, ethanol, propanol, isopropanol, butanol, isobutyl alcohol, tridecyl alcohol, isooctyl alcohol, 2-ethylhexanol, etc., and mixtures thereof. Preferably the alkanol will contain 1 to 30 carbon atoms, and still more preferably, 1 to 18 carbon atoms.

Among the substituted C-alkylmorpholines that can be used alone or in admixture with each other or with morpholine are 2-methyl-, 2,6-dimethyl-, 3-methyl-, 3,5-dimethyl-morpholine, etc.

Reaction conditions to be used should include a mol ratio of about 1 to 10 mols of alkanol per mol of morpholine compound, a temperature within the range of about 150° to 300° C., a reaction time within the range of about 10 minutes to 5 hours and a total pressure (including from about 10 to 200 atmospheres partial pressure of hydrogen) sufficient to maintain the reaction mixture in liquid phase, such as a pressure being within the range of about 500 to about 5000 p.s.i.g.

The process of the present invention may be conducted as a batch process, a continuous process, or a semi-continuous process.

The invention will be further illustrated by the following specific examples which are given by way of illustration and not as limitations on the scope of this invention.

Example I

Morpholine (174 g.) and methanol (64 g.) were placed in a one-liter stainless steel autoclave together with a catalyst charge freshly prepared by reducing 20 g. of a mixture of nickel, copper and chromium oxides in a stream of hydrogen at 230° C., the mixture having been prepared by calcining the co-precipitated carbonates at 400° C.; the mixture analyzing 38.1% Ni, 14.2% Cu, and 1.06% Cr. The autoclave was purged with hydrogen, then pressured with hydrogen to 500 p.s.i.g. and heated with agitation at 220° C. for two hours. The cooled and filtered reaction mixture was fractionally distilled to recover unreacted methanol (32%), a N-methylmorpholine-water azeotrope boiling at 94° C. (51% yield), and unreacted morpholine (33%).

Example II

A batch reaction was run as above with 87 g. of morpholine and 110 g. of ethanol (denatured) in the presence of 20 g. of the catalyst of Example I, at a reaction temperature of 220° C. for two hours. The initial hydrogen pressure was 600 p.s.i.g. at 24° C. and the final pressure was 2700 p.s.i.g. Conversion of morpholine to N-ethylmorpholine was essentially complete.

Example III

Example II was repeated, employing 50 g. of methanol (instead of ethanol), 48 g. of morpholine and 8 g. of the catalyst of Example I at 260° C. Otherwise, the conditions were the same. The final pressure was 3975 p.s.i.g. The crude product contained 30.3 parts of 4-methylmorpholine per part of morpholine.

Similarly, with methanol and 2-methylmorpholine as feed materials, there is obtained a good yield of 2,4-dimethylmorpholine.

Example IV

Morpholine and ethanol were passed at a combined space velocity of 1.93 g./hr./ml. catalyst over the nickel-copper-chromia catalyst of Example I at 179°–181° C. in a fixed-bed continuous reactor in the presence of hydrogen gas. Feed rates for morpholine, ethanol and hydrogen, respectively, were 14.2 mols/hr., 14.5 mol/hr., and 315 l. (S.T.P.)/hr. The yield of N-ethylmorpholine obtained in this run was 98% at a conversion of 68.3%.

Example V

4-STEARYLMORPHOLINE

To a one-gallon stirred autoclave was added 1080 g. (3 mols) of stearyl alcohol, 696 g. (8 mols) of morpholine, and 250 g. of the nickel-copper-chromia catalyst of Example I. The autoclave was assembled, the contents flushed twice with hydrogen and hydrogen added to 800 p.s.i.g. The reaction was run for 3 hours at 220° C. and 2500 p.s.i.g. The reaction product was filtered and distilled. The product fraction was collected, B.P. 170–184° C. at 1.5 mm. The 4-stearylmorpholine slowly solidified and was recrystallized from acetone, M.P. 34° C., N.E. 338.5.

Example VI

4-CETYLMORPHOLINE

To a one-gallon stirred autoclave was added 968 g. (4.0 mols) of cetyl alcohol, 698 g. (8.0 mols) of morpholine and 250 g. of the nickel-copper-chromia catalyst of Example I. The conditions described in Example V were also employed in this run. The product was distilled to recover the 4-cetylmorpholine and the following results obtained.

| Fraction | Wt., g. | B.p., °C. | Press., mm. | N.E. |
|---|---|---|---|---|
| 1 | 112 | −36.0 | 1.5 | |
| 2 | 51 | 36–117 | 1.5 | |
| 3 | 30 | 117–181 | 1.5 | 325 |
| 4 | 809 | 181–183 | 1.0 | 320 |
| 5 | 87 | 183–200 | 1.0 | 312 |
| 6 | 122 | residue | | |

Example VII

4-METHOXYETHYLMORPHOLINE

To a 1400 ml. rocking autoclave was added 1.5 mols of morpholine, 3.0 mols of methyl glycol ether and 50 g. of the nickel-copper-chromia catalyst of Example I. The contents were flushed with hydrogen and hydrogen added to 300 p.s.i. The reactants were heated for 4 hours at 225° C. and 2000-2500 p.s.i.g. The product was filtered to give 329 g. of liquid product. This mixture was distilled through 2.5 x 25 cm. of SS packing to give the following results.

| Fraction | Wt., g. | Head temp., °C | Press., mm. | N.E. |
|---|---|---|---|---|
| 1 | 163 | 93-126 | atm. | 625 |
| 2 | 10 | 70-91 | 26 | 145 |
| 3 | 130 | 91-93 | 26 | 145 |
| 4 | 18 | | | |

Fractions 2 and 3 proved to be 4-methoxyethylmorpholine. The yield of product was 77%.

*Example VIII*

$C_{12}+C_{14}$ ALKYLMORPHOLINE

A $C_{12}$-$C_{14}$ alkylmorpholine mixture was prepared from morpholine and a $C_{12}$-$C_{14}$ alcohol mixture. The $C_{12}$-$C_{14}$ alcohols were straight chain commercial primary alkyl alcohols. 136 g. of morpholine, 156 g. of the alcohol and 60 g. of the nickel-copper-chromia catalyst of Example I were held at 2200 p.s.i.g. and 220° C. for three hours to obtain 136 g. of alkylated morpholine boiling at about 130-147° C. at 2 mm. pressure (N.E. 281).

*Example IX*

4-ISOPROPYLMORPHOLINE

To a 1400 ml. rocking autoclave was added 174 g. (2 mols) of morpholine, 90 g. (1.5 mols) of isopropanol and 50 g. of a cobalt-copper-chromia catalyst of Example I except that the nickel was replaced with cobalt. The contents were flushed twice with hydrogen and hydrogen added to 500 p.s.i.g. The reactants were held at 220° C. and 2000 p.s.i.g. for three hours. The filtered product weighed 241 g. and was analyzed by vapor chromatography. Authentic 4-isopropylmorpholine prepared from isopropylamine and B,B-dichlorodiethyl ether, B.P. 159-159.5° C., was used as a standard. 36.2% of the reaction product was 4-isopropylmorpholine.

The run was repeated under the same conditions except that 50 g. of nickel-copper-chromia was used instead of the cobalt catalyst. 28.2% of the reaction product was 4-isopropylmorpholine.

*Example X*

4-ETHYL-2,6-DIMETHYLMORPHOLINE

To a 1400 ml. rocking autoclave was added 173 g. of 2,6-dimethylmorpholine, 92 g. of ethanol and 75 g. of the nickel-copper-chromia catalyst of Example I. The contents were purged twice with hydrogen, hydrogen added to 500 p.s.i.g. and the reaction mixture held for 3 hours at 220° C. and 1100 to 1300 p.s.i.g. The reaction product was filtered to give 243 g of colorless material. It was distilled to give 131 g. of heart cut 4-ethyl-2,6-dimethylpropholine boiling 155-157° C. (N.E. 142, theory 142). Infrared spectra showed the absence of NH and a spectra predicted for that of the product.

This application is a continuation-in-part of Norman B. Godfrey application Serial No. 71,876, filed November 28, 1960, and entitled "Method for Preparing N-Alkylmorpholines" (now abandoned).

What is claimed is:

1. A method for the preparation of an N-alkylmorpholine which comprises reacting:
   (a) a morpholine compound of the formula:

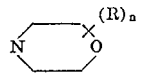

wherein R is selected from the group consisting of hydrogen and alkyl groups containing from 1 to 4 carbon atoms and $n$ is an integer of 1 to 4, and
   (b) from about 1 to 10 mols per mol of said morpholine compound of an alkanol selected from the group consisting of primary and secondary alkanols containing from 1 to 30 carbon atoms in the presence of a catalyst at a pressure within the range of about 500 to about 5,000 p.s.i.g., including about 10 to about 100 atmospheres partial pressure of hydrogen, for a contact time within the range of about 5 minutes to 5 hours to thereby provide a reaction mixture containing an N-alkylmorpholine and recovering said N-alkylmorpholine, said catalyst consisting of about 50 to about 90 wt. percent of a metal selected from the group consisting of cobalt and nickel, about 10 to 50 wt. percent of copper and about 0.5 to about 5 wt. percent of a promoter of the group consisting of chromium oxide, titanium oxide, thorium oxide, magnesium oxide, zinc oxide, manganese oxide and rare earth oxides.

2. A method as in claim 1 wherein the promoter is chromium oxide.

3. A method for the preparation of an N-alkylmorpholine which comprises reacting morpholine and from about 1 to 10 mols per mol of morpholine of an alkanol selected from the group consisting of primary and secondary alkanols containing 1 to 18 carbon atoms in the presence of a catalyst at a pressure within the range of about 500 to 5000 p.s.i.g., including about 10 to 100 atmospheres partial pressure of hydrogen, for a contact time within the range of about 5 minutes to 5 hours to thereby provide a reaction mixture containing a nontertiary N-alkylmorpholine and recovering said nontertiary N-alkylmorpholine, said catalyst consisting of about 50 to 90 wt. percent of a metal selected from the group consisting of cobalt and nickel, about 10 to 50 wt. percent of copper and about 0.5 to 5 wt. percent of a promoter selected from the group consisting of chromium oxide, titanium oxide, thorium oxide, magnesium oxide, zinc oxide, manganese oxide, and rare earth oxides.

4. A method as in claim 3 wherein the promotor is chromium oxide.

5. A method as in claim 4 wherein the alkanol is methanol.

6. A method as in claim 4 wherein the alkanol is ethanol.

7. A method as in claim 4 wherein the alkanol is a tridecyl alcohol.

8. A method as in claim 4 wherein the alkanol is an octyl alcohol.

9. A method as in claim 8 wherein the octyl alcohol is isooctyl alcohol.

10. A method as in claim 8 wherein the octyl alcohol is 2-ethylhexanol.

No references cited.